Patented June 30, 1942

2,287,868

UNITED STATES PATENT OFFICE 2,287,868

MANUFACTURE OF STORAGE BATTERIES

Robert A. Daily, Muncie, Ind., assignor to General Motors Corporation, Detroit, Mich., a corporation of Delaware No Drawing. Application December 22, 1939, Serial No. 310,553

8 Claims. (Cl. 136—78)

This invention relates to the manufacture of lead plate storage batteries and aims so to improve the method of manufacturing storage batteries that batteries having better operating characteristics can be produced at lower cost than heretofore. According to a prior practice which has been commercially used in the manufacture of storage batteries, after baking and aging, both positive and negative plates are pickled in a relatively weak sulphuric acid solution having a specific gravity of around 1.050 in order to convert the lead oxide to a lead sulphate.

Pickling in strong acid

I have discovered that pickling in a relatively strong acid produces unexpected and advantageous results particularly with respect to the positive plate. I have found that the positive plates can be pickled advantageously in a sulphuric acid solution having a strength of between 1.320 to 1.769 gravity. I prefer using sulphuric acid of about 1.550 to 1.630 specific gravity. Positive plates pasted with a paste mixture of unconverted Barton litharge and then dried in the curing tunnel required a preliminary preparation before pickling in strong acid (Barton litharge is the product of a Barton mill and comprises approximately 37½% yellow litharge, 37½% red litharge and 25% free metallic dust). After the positive plates were removed from the curing tunnel they were then dipped in water and then were allowed to stand for several days during which the paste aged. It was intended that, during the aging process, any free lead in the paste would become oxidized and that the yellow litharge (PbO) would be converted to some extent to red litharge (also PbO with a different crystal structure i. e., yellow litharge is a member of the orthorhombic system whereas red litharge is a member of the tetragonal system). It was expected that the litharge would become more stable and less reactive with the pickling acid. Apparently, the more stable the litharge became the less likely it would be that this litharge would be transformed to the ordinary normal lead sulphate during the pickling operation. The reason that transformation to ordinary normal lead sulphate is undesirable is because this ingredient is difficult to convert to lead peroxide during the formation step.

Barton litharge can be converted to approximately 92% red litharge and 8% metallic lead dust by a process described in the copending application of Ralph L. Seabury and Robert A. Daily S. N. 310,554 filed December 22, 1939. If the positive grids are pasted with a paste mixture including converted litharge which contains only red litharge and a small amount of free lead, the aging step is obviously omitted, since the cured paste contains only red litharge which is stable and substantially all of the free lead content has been oxidized during the curing and baking step.

The time of pickling depends on the strength of the acid. It requires four hours to pickle the positive plates if the acid has a gravity of 1.320. Only five minutes would be required if the gravity is 1.769. I believe that the top limit of strength of the pickling acid is 1.774. Anything above that strength dissolves the paste. I have found that satisfactory results can be obtained when pickling for 15 to 20 minutes in sulphuric acid having specific gravity of 1.550. The time required for pickling is determined by visual inspection. The unpickled paste has a distinct rose-pink color. When it is pickled it has a brownish tinge on the order of dried rose petals which were originally pink. When the paste has been pickled all the way through it has a uniform brown color throughout. But if it has not been pickled, only the outside layers will have the brown color, while the inner part remains pink.

The conventional process of pickling with a weak acid requires a long time; 15 hours for acid of 1.050 specific gravity. During pickling the outer surface of the paste is changed to ordinary normal sulphate of lead, $PbSO_4$. It is this normal lead sulphate that is very difficult to convert to lead peroxide ($PbO_2$) during the forming process of the plate which follows the pickling process. Not only does it require a long time to pickle under the conventional process, but it also requires a longer time to form the plate in order to convert the outer layers of normal lead sulphate to $PbO_2$. Normal lead sulphate is a poor electrical conductor; therefore, the plate resistance of the battery is increased making it more difficult to charge and discharge. It is only after several cycles of charging and discharging that the normal lead sulphate immediately adjacent to the grid wires disappears.

In the new process of pickling plates in relatively strong sulphuric acid, the pickling takes place in 15 minutes instead of 15 hours, and there is no layer of normal lead sulfate formed on the outer surface of the plates. I believe that in the strong pickling solution, normal lead sulfate starts to form but that, when freshly formed, it is highly reactive and occludes or adsorbs any hydrated lead oxides in the immediate vicinity to form one or more of the basic lead sulfates. These basic lead sulfates are relatively easy to convert to lead peroxide in the formation bath and may be formed in 30 hours as compared with 40 hours in the conventional process. Furthermore, the active material in the formed plates contains but very little residual sulfate after the formation process. Furthermore, the active material of the formed plates does not exhibit any normal lead sulphate after the forming process. It is believed that, during the formation process of a plate made according to the new process, the conversion to lead peroxide begins to take place at the grid wires and progresses into consecutive zones concentric to the grid wires. The result is a more homogeneous lead peroxide as the active material of positive plates.

The capacity is improved as much as 10% above that of a battery having the conventional positive plates. This improvement is more pronounced when the red lead content of the paste mixture is 25% or less. If the red lead content were to be increased above 50% it would be expected that pickling the positive plate might not effect such a pronounced improvement in the capacity. (It will be understood by those skilled in this art that capacity is a standard of comparison set up by the Society of Automotive Engineers, and that it is the number of minutes which elapses when a charged battery at a temperature of 0° F. discharges 300 amperes before the voltage per cell drops to 1 volt; or it is the number of ampere hours delivered by a charged battery at a temperature of 80° F. when discharged to a voltage of 1.75 volts per cell at a rate obtained by dividing the rated capacity of the battery in ampere hours by the number of hours at which the rating is specified.)

I have found that this pickling of the positive plate apparently has no damaging effect on the cycling life of the battery but that this pickling improves the ruggedness of the active material structure.

This pickling will also improve the ruggedness of the structure of the negative plates without having any detrimental effects on cycling life and capacity. It is believed that this pickling of the negative plate is more effective when the negative plate paste includes, as its primary expander or addition agent, ligno-sulphonic acid or ligninsulphonic acid and, as its secondary expander, the treated red oak sawdust. Less beneficial results from pickling would be obtained if the negative plate paste had included lignin as the expander.

For best results no yellow litharge should be present in the paste at the time of pickling. Therefore, it is advantageous to use the pickling process of the present invention in the manufacture of storage batteries where the grids have been pasted with a paste made from converted Barton litharge which contains only red litharge with a relative small percentage of free metallic lead.

Assembling

The plates and separators are then assembled and the terminals placed in position and burned on to provide the cell unit assembly. Each battery container cell receives one of these assemblies and a cell cover. Then the inter-cell connecting straps are secured in position and turned in place. The cell covers are secured in position by a suitable sealing compound such as a blown asphaltic compound.

Initial formation

The battery cells are filled with sulphuric acid solution of from 1.025 to 1.250 specific gravity preferably about 1.080 and are connected in an electric circuit which causes a current of about .023 ampere per square inch of positive active material through them at a voltage of from 2.1 to 2.7 volts per cell. During the initial formation process the lead sulphate compounds of the positive plate are changed to lead peroxide and the lead sulphate compounds of the negative plate are changed to sponge lead. The time required for the initial formation step has been materially reduced as the result of pickling the positive plates in strong acid as has been explained in the description of the pickling process. Under the old conventional process of pickling in weak acid it required 40 to 48 hours to form positive plates. The improved pickling process has reduced the forming time to 30 to 35 hours. The capacity of the battery is immediately improved since there is but little normal lead sulphate left in the positive plate after the initial formation step. Greater uniformity of product is obtained since the pickling step produces a condition whereby the initial formation step results in a more homogeneous lead peroxide as the active material of the positive plate. The practice of pickling in strong acid can be used advantageously where the conversion of yellow litharge to red litharge has taken place prior to the mixing of the paste. The conversion of the product of the Barton mill to a litharge, which is a red litharge only, removes the uncertainty of transformation of yellow litharge to red litharge during subsequent steps in the process. I have discovered that the use of a litharge which is red litharge only enables pickling the plates in acid much stronger than heretofore used thereby reducing the time of pickling and producing a condition, in the positive plates at least, which enables initial formation of the plates in less time than heretofore possible and to produce active material for the positive plate which is more homogeneous than heretofore obtained.

Final fill

After the initial formation step the battery is emptied and is filled with sulphuric acid solution of 1.250 to 1.400 specific gravity depending upon gravity used during initial formation either at the factory or at some distributing point to which the battery is shipped dry.

Heretofore the practice of shipping to foreign countries has been to export batteries with formed plates without the electrolyte. The separators are kept from drying out by sealing the battery cells, but even then it is necessary to recharge the plates when they arrive in a foreign country. This requires at least sixty hours and the battery does not perform as well after this second charge. I have found that a battery having its plates pickled in strong acid can be stored for a substantial period of time prior to initial formation without deleterious effect upon battery characteristics after formation. Therefore, it is obvious that pickling in strong acid produces such a condition of the plates that batteries may be shipped dry to distant points, and then be rendered operative by the steps already described under "Initial formation" and "Final fill" without the necessity of any further charging.

While the embodiment of the present invention as herein disclosed, constitutes a preferred form, it is to be understood that other forms might be adopted, all coming within the scope of the claims which follow.

What is claimed is as follows:

1. In the process for conditioning pasted lead storage battery plates for use in storage batteries of the sulphuric acid type; the step of pickling the pasted plates in a sulphuric acid solution having a specific gravity in the range of from 1.320 to 1.774 for a time sufficient to convert substantially all of the lead oxide to a basic lead sulphate.

2. In a process for conditioning lead storage battery plates for use in storage batteries of the sulphuric acid type; the step of immersing the pasted plates in sulphuric acid solution having a specific gravity of between 1.320 and 1.774 in order to convert substantially all of the lead oxide to a basic lead sulphate.

3. In the process of conditioning pasted lead storage battery plates for the use in storage batteries of the sulphuric acid type, the step of pickling the pasted plates in the sulphuric acid solution having a specific gravity in the range of from 1.320 to 1.774 for from about four hours to five minutes according to the strength of the acid solution for converting the lead oxide in the plate paste substantially completely to a basic lead sulphate.

4. In the process for conditioning pasted lead storage battery plates for improving the operating characteristics when subsequently used in storage batteries; the step of immersing the plates in a sulphuric acid solution having specific gravity of about 1.550 for a period of from fifteen to twenty minutes.

5. In the process for conditioning pasted lead storage battery plates for improving the operating characteristics when subsequently used in storage batteries; the step of pickling the plates in sulphuric acid solution having a specific gravity of about 1.550 for a time sufficient to convert substantially all of the lead oxide in the paste to a basic lead sulphate.

6. In the process for conditioning pasted lead storage battery plates for use in storage batteries of the sulphuric acid type; the steps of pickling the pasted plates in a sulphuric acid solution having a specific gravity in the range of from 1.320 to 1.774 for a time sufficient to convert substantially all of the lead oxide to a basic lead sulphate; and then, after the plates have been assembled in a battery, forming the plates by the addition of less than 1.300 specific gravity sulphuric acid.

7. In the process for converting lead oxide in pasted storage battery plates to basic lead sulphate during the conditioning treatment prior to the formation of the plates; that step of pickling the pasted plates in a solution of sulphuric acid having a specific gravity in the range of from 1.550 to 1.630 from 15 to 20 minutes.

8. The process of conditioning pasted lead storage battery plates for transforming the lead oxide therein to basic lead sulphate; the steps of immersing the plates in sulphuric acid solution having a specific gravity in the range of from 1.550 to 1.630 for a period of less than one hour and sufficient for completing said transformation.

ROBERT A. DAILY.